United States Patent [19]

Forsberg

[11] 4,447,348

[45] * May 8, 1984

[54] CARBOXYLIC SOLUBILIZER/SURFACTANT COMBINATIONS AND AQUEOUS COMPOSITIONS CONTAINING SAME

[75] Inventor: John W. Forsberg, Mentor-on-the-Lake, Ohio

[73] Assignee: The Lubrizol Corporation, Wickliffe, Ohio

[*] Notice: The portion of the term of this patent subsequent to May 11, 1999 has been disclaimed.

[21] Appl. No.: 352,693

[22] Filed: Mar. 4, 1982

Related U.S. Application Data

[63] Continuation of Ser. No. 238,394, Feb. 25, 1981, Pat. No. 4,368,133, which is a continuation-in-part of Ser. No. 26,384, Apr. 2, 1979, abandoned, which is a continuation-in-part of Ser. No. 948,460, Oct. 4, 1978, abandoned, which is a continuation-in-part of Ser. No. 946,294, Sep. 27, 1978, Pat. No. 4,329,249.

[51] Int. Cl.$^3$ .................. C10M 1/08; C10M 1/06; C10M 3/04
[52] U.S. Cl. .................. 252/75; 44/51; 44/71; 252/33.6; 252/34; 252/34.7; 252/49.3; 252/51.5 A; 252/49.5; 252/77; 252/357
[58] Field of Search .................. 252/75, 49.3, 51.5 A, 252/355, 357, 49.5, 34, 34.7, 33.6

[56] References Cited

U.S. PATENT DOCUMENTS

| | | |
|---|---|---|
| 2,008,939 | 7/1935 | Tufts . |
| 2,060,110 | 11/1936 | Paxton . |
| 2,287,639 | 6/1942 | Pings . |
| 2,345,199 | 3/1944 | Hodson . |
| 2,455,961 | 12/1948 | Walker . |
| 2,914,975 | 12/1959 | Cavanaugh et al. . |
| 2,944,976 | 7/1960 | Waters et al. . |
| 3,006,849 | 10/1961 | Plemich .................. 252/34.7 |
| 3,087,936 | 4/1963 | LeSuer . |
| 3,105,050 | 9/1963 | Fischer .................. 252/76 |
| 3,216,936 | 11/1965 | LeSuer .................. 252/32.7 |
| 3,269,946 | 8/1966 | Wiese .................. 252/32.5 |
| 3,311,561 | 3/1967 | Anderson et al. .................. 252/75 |
| 3,324,032 | 6/1967 | O'Halloran . |
| 3,378,494 | 4/1968 | Berger .................. 252/77 |
| 3,390,082 | 6/1968 | LeSuer . |
| 3,489,682 | 1/1970 | LeSuer . |
| 3,630,898 | 12/1971 | Teeter et al. .................. 252/34.7 |
| 3,639,277 | 2/1972 | Poettmann et al. . |
| 3,657,123 | 4/1972 | Stram . |
| 3,796,662 | 3/1974 | Lyle et al. . |
| 3,798,164 | 3/1974 | Kmet et al. . |
| 3,809,651 | 5/1974 | Crawford et al. . |
| 3,844,960 | 10/1974 | Breitgam et al. . |
| 3,879,306 | 4/1975 | Kabliasoul et al. . |
| 3,902,929 | 9/1975 | Meszaros . |
| 3,920,562 | 11/1975 | Foehr . |
| 3,933,659 | 1/1976 | Lyle et al. . |
| 3,992,312 | 11/1976 | Genjida et al. . |
| 3,995,465 | 12/1976 | Felton . |
| 4,010,105 | 3/1977 | Holgado .................. 252/77 |
| 4,010,106 | 3/1977 | Kothert . |
| 4,010,107 | 3/1977 | Rothert . |
| 4,048,080 | 9/1977 | Lee et al. . |
| 4,053,426 | 10/1977 | Davis et al. . |
| 4,098,585 | 7/1978 | Vartanian et al. . |
| 4,101,429 | 7/1978 | Birke . |
| 4,118,331 | 10/1978 | Jahnke . |
| 4,138,346 | 2/1979 | Nassry et al. . |
| 4,151,099 | 4/1979 | Nassry et al. . |
| 4,176,074 | 11/1979 | Coupland et al. . |
| 4,185,485 | 1/1980 | Schick et al. .................. 72/42 |
| 4,212,750 | 7/1980 | Gorman . |
| 4,225,447 | 9/1980 | Low et al. .................. 252/34.7 |
| 4,253,974 | 3/1981 | Valcho et al. .................. 252/8.55 D |
| 4,253,975 | 3/1981 | Law et al. .................. 252/32.7 |
| 4,257,902 | 3/1981 | Singer .................. 252/18 |
| 4,329,249 | 5/1982 | Forsberg .................. 252/34.7 |
| 4,368,133 | 1/1983 | Forsberg .................. 252/75 |

FOREIGN PATENT DOCUMENTS

| | | |
|---|---|---|
| 984409 | 2/1965 | United Kingdom . |
| 1009197 | 10/1965 | United Kingdom . |
| 1020293 | 2/1966 | United Kingdom . |
| 1031130 | 5/1966 | United Kingdom . |
| 1068506 | 5/1967 | United Kingdom . |
| 1098936 | 1/1968 | United Kingdom . |
| 1206059 | 9/1970 | United Kingdom . |
| 1236161 | 6/1971 | United Kingdom . |
| 1254074 | 11/1971 | United Kingdom . |
| 1532836 | 11/1978 | United Kingdom . |
| 2014187 | 8/1979 | United Kingdom . |
| 2031908 | 4/1980 | United Kingdom . |

*Primary Examiner*—P. E. Willis, Jr.
*Attorney, Agent, or Firm*—D. A. Polyn; R. F. Keller

[57] ABSTRACT

Combinations of carboxylic solubilizers, made by reaction of an acylating agent with an N-(hydroxyl-substituted hydrocarbyl) amine and surfactants are useful in incorporating oil-soluble, water-insoluble functional additives into aqueous systems. Typical solubilizers are made by reacting an alkyl-substituted succinic anhydride containing about 12 to about 500 carbon atoms with an alkanol amine such as diethyl ethanol amine. Typical surfactants are non-ionic hydrophilic surfactants such as ethoxylated phenols and ionic surfactants of both the anionic and cationic type. Typical functional additives are anti-wear, extreme pressure and load-carrying agents such as dithiophosphates. The aqueous systems formed with the aid of such combinations are useful, for example, as water-based hydraulic fluids.

88 Claims, No Drawings

CARBOXYLIC SOLUBILIZER/SURFACTANT COMBINATIONS AND AQUEOUS COMPOSITIONS CONTAINING SAME

REFERENCE TO RELATED APPLICATIONS

This application is a continuation of U.S. Ser. No. 238,394, filed Feb. 25, 1981, U.S. Pat. No. 4,368,133, which, in turn, is a continuation-in-part of U.S. Ser. No. 026,384, filed Apr. 2, 1979, now abandoned, which, in turn, is a continuation-in-part of U.S. Ser. No. 948,460, filed Oct. 4, 1978, now abandoned, which, in turn, is a continuation-in-part of U.S. Ser. No. 946,294, filed Sept. 27, 1978, now U.S. Pat. No. 4,329,249. The disclosures of these prior applications are hereby incorporated by reference in this application in their entirety.

FIELD OF THE INVENTION

This invention relates to carboxylic solubilizer/surfactant combinations and aqueous systems made from them. More particularly, the solubilizers are made from acylating agents having hydrocarbyl substituents of about 12 to about 500 carbon atoms and N-(hydroxyl-substituted hydrocarbyl) amines, hereinafter, hydroxyl hydrocarbyl amines. The use of these combinations to prepare aqueous systems containing oil-soluble, water-insoluble functional additives is also within the scope of the invention.

PRIOR ART

Carboxylic acid derivatives made from high molecular weight carboxylic acid acylating agents and amino compounds and their use in oil-based lubricants are well known. See, for example, U.S. Pat. Nos. 3,216,936; 3,219,666; 3,502,677; and 3,708,522.

Certain alkyl succinic acid/alkanol amine condensates have also been described; see, for example, U.S. Pat. No. 3,269,946. Water-in-oil emulsions containing alkyl and alkenyl succinic acid derivatives are also known; see, for example, U.S. Pat. Nos. 3,255,108; 3,252,908 and 4,185,485.

Non-ionic hydrophilic surfactants are also well known. See, for example, the text entitled "Non-ionic Surfactants" edited by M. J. Schick, published by Marcel Dekker, Inc., New York, 1967.

Oil-soluble, water-insoluble functional additives are also well known. See, for example, the treatises by C. B. Smalheer and R. Kennedy Smith, published by Lezius-Hiles Co., Cleveland, Ohio, 1967, and by M. W. Ranney, published by Noyes Data Corp., Parkridge, N.J., 1973 entitled "Lubricant Additives". In this connection, and throughout the specification and appended claims, a water-insoluble functional additive is one which is not soluble in water above a level of about 1 gram per 100 milliliters of water at 25° but is soluble in mineral oil to the extent of at least one gram per liter at 25°.

BACKGROUND OF THE INVENTION

For many decades it has been a common practice to improve the properties of hydrocarbyl oil-based lubricants and fuels through the use of oil-soluble, water-insoluble functional additives. These additives improve the oil's, for example, load-carrying and extreme pressure properties. In recent times, the increasing cost and scarcity of petroleum has made it increasingly desirable to replace oil-based compositions with aqueous systems where ever possible. Other benefits can also flow from such replacements such as decreased fire hazard and environmental pollution problems. In many cases, however, it is not feasible to make such replacements because the aqueous systems cannot be modified in their properties so as to perform to the same high degree as their oil-based counterparts do. For example, it has been often difficult and even impossible to replace certain oil-based hydraulic fluids with water-based fluids even though the desirability of doing so is evident.

It has now been found that through the use of the carboxylic solubilizer/surfactant combinations of the present invention, it is possible to incorporate in aqueous systems, water-insoluble additives which enable the systems to be useful, for example, as hydraulic fluids.

Therefore, it is an object of this invention to provide carboxylic solubilizer/surfactant combinations which are useful in preparing aqueous concentrates and systems which can be used to replace certain oil-based compositions of the prior art. Other objects and advantages of the invention will be apparent upon the study of the following specification and claims.

BRIEF DESCRIPTION OF THE INVENTION

This invention comprises a composition comprising the combination of (A) at least one nitrogen-containing, phosphorus-free carboxylic solubilizer made by reaction of (A)(I) at least one carboxylic acid acylating agent having at least one hydrocarbyl-based substituent of at least about 12 to about 500 carbon atoms with (A)(II) at least one (a) N-(hydroxyl-substituted hydrocarbyl) amine, (b) hydroxyl-substituted poly(hydrocarbyloxy) analog of said amine or (c) mixtures of (a) and (b); with (B) at least one surfactant.

The invention also includes aqueous systems comprising at least about 40% of water and the afore-described combination with the proviso that said system contains less than about 15% hydrocarbyl oil. Such aqueous compositions encompass both concentrates containing about 40% to about 70% water and water-based functional fluids made from such concentrates with water where the ratio of water to concentrate is in the range of about 80:20 to about 99:1 and water-based functional fluids made from said combination and water wherein the water to combination ratio is in the range of about 80:20 to 99:1 (said ratios being by weight).

Methods for preparing aqueous systems containing (C) at least one oil-soluble, water-insoluble functional additive which comprises the steps of:

(1) mixing the afore-described combination with said functional additive (C) to form a dispersion/solution; optionally (2) combining said dispersion/solution with water to form said concentrate with the proviso that there is present less than 15% hydrocarbyl oil present; and/or optionally (3) diluting said concentrate or dispersion/solution with water wherein the total amount of water used is in the amount required to provide the desired concentration of said functional additive (C) in water;

are within the scope of the invention. Alternatively, the amount of water used in step (2) or (3) can be such that the functional fluid is made directly without going through the separate step of forming a concentrate.

DETAILED DESCRIPTION OF THE INVENTION

The carboxylic acid acylating agent, (A)(I)

The acylating agent used in making the solubilizers (A) of the present inventive combination are well known to those of skill in the art and have been found to be useful as additives for lubricants and fuels and as intermediates for preparing the same. See, for example, the following U.S. Patents which are hereby incorporated by reference for their disclosures relating to carboxylic acid acylating agents U.S. Pat. Nos.: 3,219,666; 3,272,746; 3,381,022; 3,254,025; 3,278,550; 3,288,714; 3,271,310; 3,373,111; 3,346,354; 3,272,743; 3,374,174; 3,307,928; and 3,394,179.

Generally, these carboxylic acid acylating agents are prepared by reacting an olefin polymer or chlorinated analog thereof with an unsaturated carboxylic acid or derivative thereof such as acrylic acid, fumaric acid, maleic anhydride and the like. Often they are polycarboxylic acylating agents such as hydrocarbyl-substituted succinic acids and anhydrides. These acylating agents have at least one hydrocarbyl-based substituent of about 12 to about 500 carbon atoms. Generally, this substituent has an average of about 20, typically 30, to about 300 carbon atoms; often it has an average of about 50 to about 250 carbon atoms.

As used herein, the terms "hydrocarbon-based", "hydrocarbon-based substituent" and the like denote a substituent having a carbon atom directly attached to the remainder of the molecule and having predominantly hydrocarbyl character within the context of this invention. Such substituents include the following:

(1) hydrocarbon substituents, that is, aliphatic (e.g., alkyl or alkenyl), alicyclic (e.g., cycloalkyl, cycloalkenyl) substituents, aromatic-, aliphatic- and alicyclic-substituted aromatic nuclei and the like as well as cyclic substituents wherein the ring is completed through another portion of the molecule (that is, any two indicated substituents may together form an alicyclic radical);

(2) substituted hydrocarbon substituents, that is, those substituents containing non-hydrocarbon radicals which, in the context of this invention, do not alter the predominantly hydrocarbyl substituent; those skilled in the art will be aware of such radicals (e.g., halo (especially chloro and fluoro)), alkoxyl, mercapto, alkylmercapto, nitro, nitroso, sulfoxy, etc.;

(3) hetero substituents, that is, substituents which will, while having predominantly hydrocarbyl character within the context of this invention, contain other than carbon present in a ring or chain otherwise composed of carbon atoms. Suitable heteroatoms will be apparent to those of skill in the art and include, for example, sulfur, oxygen, nitrogen and such substituents as e.g., pyridyl, furanyl, thiophenyl, imidazolyl, etc., are exemplary of these hetero substituents.

In general, no more than about three radicals or heteroatoms and preferably no more than one, will be present for each ten carbon atoms in the hydrocarbon-based substituents. Typically, there will be no such radicals or heteroatoms in the hydrocarbon-based substituent and it will, therefore, be purely hydrocarbyl.

In general, the hydrocarbon-based substituents present in the acylating agents used in this invention are free from acetylenic unsaturation; ethylenic unsaturation, when present will generally be such that there is no more than one ethylenic linkage present for every ten carbon-to-carbon bonds in the substituent. The substituents are often completely saturated and therefore contain no ethylenic unsaturation.

As noted above, the hydrocarbon-based substituents present in the acylating agents of this invention may be derived from olefin polymers or chlorinated analogs thereof. The olefin monomers from which the olefin polymers are derived are polymerizable olefins and monomers characterized by having one or more ethylenic unsaturated group. They can be monoolefinic monomers such as ethylene, propylene, butene-1, isobutene and octene-1 or polyolefinic monomers (usually di-olefinic monomers such as butadiene-1,3 and isoprene). Usually these monomers are terminal olefins, that is, olefins characterized by the presence of the group $>C=CH_2$. However, certain internal olefins can also serve as monomers (these are sometimes referred to as medial olefins). When such medial olefin monomers are used, they normally are employed in combination with terminal olefins to produce olefin polymers which are interpolymers. Although the hydrocarbyl-based substituents may also include aromatic groups (especially phenyl groups and lower alkyl and/or lower alkoxy-substituted phenyl groups such as para(tertiary butyl)-phenyl groups) and alicyclic groups such as would be obtained from polymerizable cyclic olefins or alicyclic-substituted polymerizable cyclic olefins. The olefin polymers are usually free from such groups. Nevertheless, olefin polymers derived from such interpolymers of both 1,3-dienes and styrenes such as butadiene-1,3 and styrene or para(tertiary butyl)styrene are exceptions to this general rule.

Generally the olefin polymers are homo- or interpolymers of terminal hydrocarbyl olefins of about two to about 16 carbon atoms. A more typical class of olefin polymers is selected from that group consisting of homo- and interpolymers of terminal olefins of two to six carbon atoms, especially those of two to four carbon atoms.

Specific examples of terminal and medial olefin monomers which can be used to prepare the olefin polymers from which the hydrocarbon-based substituents are derived include ethylene, propylene, butene-1, butene-2, isobutene, pentene-1, hexene-1, heptene-1, octene-1, nonene-1, decene-1, pentene-2, propylene tetramer, diisobutylene, isobutylene trimer, butadiene-1,2, butadiene-1,3, pentadiene-1,2, pentadiene-1,3, isoprene, hexadiene-1,5, 2-chlorobutadiene-1,3, 2-methylheptene-1, 3-cyclohexylbutene-1, 3,3-dimethylpentene-1, styrenedivinylbenzene, vinylacetate allyl alcohol, 1-methylvinylacetate, acrylonitrile, ethylacrylate, ethylvinylether and methylvinylketone. Of these, the purely hydrocarbyl monomers are more typical and the terminal olefin monomers are especially typical.

Often the olefin polymers are poly(isobutene)s such as obtained by polymerization of a $C_4$ refinery stream having a butene content of about 35 to about 75 percent by weight and an isobutene content of about 30 to about 60 percent by weight in the presence of a Lewis acid catalyst such as aluminum chloride or boron trifluoride. These polyisobutenes contain predominantly (that is, greater than 80% of the total repeat units) isobutene repeat units of the configuration

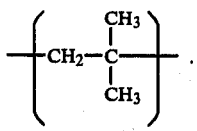

Typically, the hydrocarbyl-based substituent in the carboxylic acid acylating agent as used in the present invention is a hydrocarbyl, alkyl or alkenyl group of about 12 to about 500 carbon atoms which can be represented by the indicia "hyd". Useful acylating agents include substituted succinic acid agents containing hydrocarbyl-based substituents of about 30–500 carbon atoms.

Often the agents (A)(I) used in making the solubilizers (A) are substituted succinic acids or derivatives thereof which can be represented by the formula:

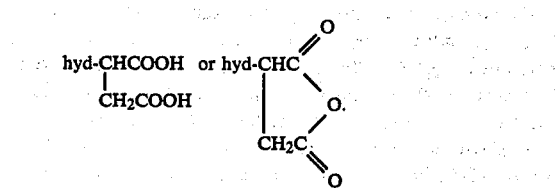

Such succinic acid acylating agents can be made by the reaction of maleic anhydride, maleic acid, or fumaric acid with the afore-described olefin polymer, as is shown in the patents cited above. Generally, the reaction involves merely heating the two reactants at a temperature of about 150° to about 200°. Mixtures of the afore-said polymeric olefins, as well as mixtures of unsaturated mono- and dicarboxylic acids can also be used.

The N-(hydroxyl-substituted hydrocarbyl) amine, (A) (II)

The hydroxyl hydrocarbyl amines of the present invention generally have one to about four, typically one to about two hydroxyl groups per molecule. These hydroxyl groups are each bonded to a hydrocarbyl group to for a hydroxyl-substituted hydrocarbyl group which, in turn, is bonded to the amine portion of the molecule. These N-(hydroxyl-substituted hydrocarbyl) amines can be monoamines or polyamines and they can have a total of up to about 40 carbon atoms; generally they have a total of about 20 carbon atoms. Typically, however, they are monoamines containing but a single hydroxyl group. These amines can be primary, secondary or tertiary amines while the N-(hydroxyl-substituted hydrocarbyl) polyamines can have one or more of any of these types of amino groups. Mixtures of two or more of any of the afore-described amines (A)(II) can also be used to make the carboxylic solubilizer (A).

Specific examples N-(hydroxyl-substituted hydrocarbyl)amines suitable for use in this invention are the N-(hydroxy-lower alkyl)amines and polyamines such as 2-hydroxyethylamine, 3-hydroxybutylamine, di-(2-hydroxyethyl)amine, tri-(2-hydroxyethyl)amine, di-(2-hydroxypropyl)amine, N,N,N'-tri-(2-hydroxyethyl)ethylenediamine, N,N,N',N'-tetra(2-hydroxyethyl)ethylenediamine, N-(2-hydroxyethyl)piper-azine, N,N'-di-(3-hydroxypropyl)piperazine, N-(2-hydroxyethyl) morpholine, N-(2-hydroxyethyl)-2-morpholinone, N-(2-hydroxyethyl)-3-methyl-2-morpholinone, N-(2-hydroxypropyl)-6-methyl-2-morpholinone, N-(2-hydroxyethyl)-5-carbethoxy-2-piperidone, N-(2-hydroxypropyl)-5-carbethoxy-2-piperidone, N-(2-hydroxyethyl)-5-(N-butylcarbamyl)-2-piperidone, N-(2-hydroxyethyl)piperidine, N-(4-hydroxybutyl) piperidine, N,N-di-(2-hydroxyethyl)glycine, and ethers thereof with aliphatic alcohols, especially lower alkanols, N,N-di(3-hydroxypropyl) glycine, and the like.

Further amino alcohols are the hydroxy-substituted primary amines described in U.S. Pat. No. 3,576,743 by the general formula $$R_a-NH_2$$

where $R_a$ is a monovalent organic radical containing at least one alcoholic hydroxy group, according to this patent, the total number of carbon atoms in $R_a$ will not exceed about 20. Hydroxy-substituted aliphatic primary amines containing a total of up to about 10 carbon atoms are useful. Generally useful are the polyhydroxy-substituted alkanol primary amines wherein there is only one amino group present (i.e., a primary amino group) having one alkyl substituent containing up to 10 carbon atoms and up to 4 hydroxyl groups. These alkanol primary amines correspond to $R_aNH_2$ wherein $R_a$ is a mono- or polyhydroxy-substituted alkyl group. It is typical that at least one of the hydroxyl groups be a primary alcoholic hydroxyl group. Trismethylolaminomethane is a typical hydroxy-substituted primary amine. Specific examples of the hydroxy-substituted primary amines include 2-amino-1-butanol, 2-amino-2-methyl-1-propanol, p-(beta-hydroxyethyl)-analine, 2-amino-1-propanol, 3-amino-1-propanol, 2-amino-2-methyl-1,3-propanediol, 2-amino-2-ethyl-1,3-propanediol, N-(betahydroxypropyl)-N'-beta-aminoethyl)piperazine, 2-amino-1-butanol, ethanolamine, beta-(betahydroxy ethoxy)-ethyl amine, glucamine, glusoamine, 4-amino-3-hydroxy-3-methyl-1-butene (which can be prepared according to procedures known in the art by reacting isopreneoxide with ammonia), N-3-(aminopropyl)-4(2-hydroxyethyl)-piperadine, 2-amino-6-methyl-6-heptanol, 5-amino-1-pentanol, N-(beta-hydroxyethyl)-1,3-diamino propane, 1,3-diamino-2-hydroxy-propane, N-(beta-hydroxy ethoxyethyl)-ethylenediamine, and the like. For further description of the hydroxy-substituted primary amines useful as the N-(hydroxyl-substituted hydrocarbyl) amines in this invention see U.S. Pat. No. 3,576,743 which is expressly incorporated herein by reference for its disclosure of such amines.

Typically, the amine (A)(II) is a primary, secondary or tertiary alkanol amine or mixture thereof. Such amines can be represented, respectively, by the formulae:

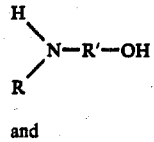

and

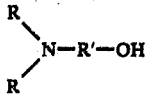

wherein each R is independently a hydrocarbyl group of one to about eight carbon atoms or hydroxyl-substituted hydrocarbyl group of two to about eight carbon atoms and R' is a divalent hydrocarbyl group of about two to about eighteen carbon atoms. The group —R'—OH in such formulae represents the hydroxyl-substituted hydrocarbyl group. R' can be an acyclic, alicyclic or aromatic group. Typically, it is an acyclic straight or branched alkylene group such as an ethylene, 1,2-propylene, 1,2-butylene, 1,2-octadecylene, etc. group. Where two R groups are present in the same molecule they can be joined by a direct carbon-to-carbon bond or through a heteroatom (e.g., oxygen, nitrogen or sulfur) to form a 5-, 6-, 7- or 8-membered ring structure. Examples of such hetrocyclic amines include N-(hydroxyl lower alkyl)-morpholines, -thiomorpholines, -piperidines, oxazolidines, -thiazolidines and the like. Typically, however, each R is a lower alkyl group of up to 7 carbon atoms.

The amine (A)(II) can also be an ether N-(hydroxyl-substituted hydrocarbyl)amine. These are hydroxyl-substituted poly(hydrocarbyloxy) analogs of the above-described amines (these analogs also include hydroxyl-substituted oxyalkylene analogs). Such amines can be conveniently prepared by reaction of epoxides with afore-described amines and can be represented by the formulae:

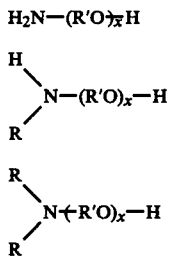

wherein x is a number from 2 to about 15 and R and R' are as described above.

Polyamine analogs of these alkanol amines, particularly alkoxylated alkylene polyamines (e.g., N,N-(diethanol)ethylene diamine) can also be used to make the solubilizers of this invention. Such polyamines can be made by reacting alkylene amines (e.g., ethylene diamine) with one or more alkylene oxides (e.g., ethylene oxide, octadecene oxide) of two to about twenty carbons. Similar alkylene oxide-alkanol amine reaction products can also be used such as the products made by reacting the afore-described primary, secondary or tertiary alkanol amines with ethylene, propylene or higher epoxides in a 1:1 or 1:2 molar ratio. Reactant ratios and temperatures for carrying out such reactions are known to those skilled in the art.

Specific examples of alkoxylated alkylene polyamines include N-(2-hydroxyethyl)ethylene diamine, N,N-bis(2-hycroxyethyl)-ethylene diamine, 1-(2-hydroxyethyl)piperazine, mono(hydroxypropyl)-substituted diethylene triamine, di(hydroxypropyl)-substituted tetraethylene pentamine, N-(3-hydroxybutyl)-tetramethylene diamine, etc. Higher homologs obtained by condensation of the above-illustrated hydroxy alkylene polyamines through amino radicals or through hydroxy radicals are likewise useful. Condensation through amino radicals results in a higher amine accompanied by removal of ammonia while condensation through the hydroxy radicals results in products containing ether linkages accompanied by removal of water. Mixtures of two or more of any of the aforedescribed mono-or polyamines are also useful.

Particularly useful examples of N-(hydroxyl-substituted hydrocarbyl)amines (A)(II) include mono-, di-, and triethanol amine, diethylethanol amine, di-(3-hydroxyl propyl) amine, N-(3-hydroxyl butyl) amine, N-(4-hydroxyl butyl) amine, N,N-di-(2-hydroxyl propyl) amine, N-(2-hydroxyl ethyl) morpholine and its thio analog, N-(2-hydroxyl ethyl) cyclohexyl amine, N-3-hydroxyl cyclopentyl amine, o-, m- and p-aminophenol, N-(hydroxyl ethyl) piperazine, N,N'-di(hydroxyl ethyl) piperazine, and the like. Preferred amines are diethyl ethanol amine and ethanol amine and mixtures thereof.

The Reaction of the Acylating Agent (A)(I) with the Hydroxyl Amine (A)(II) to form the Nitrogen-containing Carboxylic Solubilizer (A)

The reaction of the acylating agent (A)(I) with the hydroxyl amine (A)(II) can be carried out at temperatures ranging from about 30° to the decomposition temperature of the reaction components and/or products having the lowest such temperature. Generally it is carried out at a temperature in the range of about 50° to about 150°; but usually at a temperature below about 100°. Often the reaction is carried out under ester-forming conditions and the product thus formed is, for example, an ester, salt, amide, imide, amic ester or mixture of such products. The salt may be an internal salt, wherein one of the carboxyl groups becomes ionically bound to a nitrogen atom within the same group or it may be an external salt wherein the ionic salt group is formed with a nitrogen atom which is not part of the same group forming the ester group. Mixtures of acylating agents and/or mixtures of hydroxyl amines can be used.

Generally, the ratio of acylating agent to N-(hydroxyl-substituted hydrocarbyl)amine is in the range of 0.5 to about 3 moles of amine (A)(II) per equivalent of acylating agent (A)(I). An equivalent of acylating agent (A)(I) can be determined by dividing its molecular weight by the number of carboxyl functions present. These can usually be determined from the structural formula of the acylating agent or empirically through well-known titration procedures. For example, a succinic acid anhydride or di(alkyl) ester acylating agent has an equivalent weight of one-half its molecular weight.

In addition to the acylating agent (A)(I) there may also be present in the solubilizer-forming reaction mixture one or more lower molecular weight mono- or poly-carboxylic acid acylating agents of one to about less than 18 carbons such as fatty acids having 10 to about 18 carbon atoms or a tetrapropenyl-substituted succinic anhydride. In such cases the moles of lower acylating agent present will be at least less than those of the acylating agent (A)(I) and the total equivalents of lower acylating agent plus acylating agent (A)(I) will still fall within the afore-described ratios.

Typical lower (MW) monocarboxylic acylating agents include saturated and unsaturated fatty acids, such as lauric acid, stearic acid, oleic acid, myristic acid, linoleic acid, and the like. Anhydrides, when available, and lower alkyl esters of these acids can also be used. Mixtures of two or more such agents can also be successfully used. An extensive discussion of such acids is found in Kirk-Othmer "Encyclopedia of Claimed Technology" 2nd Edition, 1965, John Wiley & Sons New York pages 811–856. Acylating agents including acetic acid, propionic acid, butyric acid, acrylic and benzoic acid as well as their anhydrides and lower aklyl esters are also useful.

Among the useful lower Mw polycarboxylic acylating agents are maleic acid, fumaric acid, itaconic acid, mesaconic acid, succinic acid phthalic acid, alkyl-substituted phthalic acids, isophtahalic acid, malonic acid, glutaric acid, adipic acid, citraconic acid, glutaconic acid, chloromaleic acid, atconic acid, scorbic acid, etc. Again anhydrides, when available, and lower alkyl esters and esters of these acids can be use as lower Mw acylating agents.

Certain substituted succinic acid and anhydride lower Mw acylating agents can also be used. A number of these are discussed in the above-cited Kirk-Othmer article at pages 847–849. The typical such acylating agents can be represented by the formula:

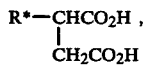

wherein $R^*$ is a $C_1$ to about a $C_{10}$ hydrocarbyl group. Preferably, $R^*$ is an aliphatic or alicyclic hydrocarbyl group less than 10% of its carbon-to-carbon bonds unsaturated. Examples of such groups are 4-butylcyclohexyl, di(isobutyl), decyl, etc. The production of such substituted succinic acids and their derivatives via alkylation of maleic acid or its derivatives with a halohydrocarbon is well known to those of skill in the art and need not be discussed in detail at this point.

Acid halides of the afore-described lower Mw mono- and polycarboxylic acids can be used as lower Mw acylating agents in this invention. These can be prepared by the reaction of such acids or their anhydrides with halogenating agents such as phosphorus tribromide, phosphorus pentachloride, phosphorus oxychloride, or thionyl chloride. Esters of such acids can be prepared simply by the reaction of the acid, acid halide or anhydride with an alcohol or phenolic compound. Particularly useful are the lower alkyl and alkenyl alcohols such as methanol, ethanol, allyl alcohol, propanol, cyclohexanol, etc. Esterification reactions are usually promoted by the use of alkaline catalysts such as sodium hydroxide or alkoxide, or an acidic catalyst such as sulfuric acid or toluene sulfonic acid.

The reaction of acylating agent and hydroxyl amine can be carried out in the presence of a normally liquid, substantially inert, organic solvent/diluent such as benzene, octane, and commercial mixtures such as the various textile spirits and naphthas. Mineral oils in small amounts can also be used. Such solvent/diluents aid in temperature control, viscosity control and the like. Often, however, when the reactants are sufficiently fluid such solvent/diluents are not used and the reaction is carried out in the absence of any materials other than the acylating agent (A)(I) and the hydroxyl amine (A)-(II).

The Surfactant (B)

The nitrogen-containing, phosphorus-free carboxylic solubilizers (A) of this invention are used in combination with at least one surfactant or wetting agent, (B). This surfactant serves to reduce the viscosity of the solubilizer making it more easily handled and often also aids in the dispersal of the solubilizer and functional additive in the aqueous system. Typically, the surfactant (B) is a hydrophilic surfactant and, generally, it has an HLB (hydrophilic-lipophilic balance) in the range of about 10 to about 20.

The surfactant can be of the cationic, anionic, non-ionic or amphoteric type. Many such surfactants of each type are known to the art. See, for example, McCutcheon's "Detergents and Emulsifiers", 1978, North American Edition, published by McCutcheon's Division, MC Publishing Corporation, Glen Rock, N.J., U.S.A., particularly pages 17–33 which are hereby incorporated by reference for their disclosures in this regard.

Of these surfactants (B), non-ionic surfactants are generally used. A number of non-ionic surfactant types are known. Among these are the alkylene oxide-treated products, such as ethylene oxide-treated phenols, alcohols, esters, amines and amides. Ethylene oxide/propylene oxide block copolymers are also useful non-ionic surfactants. Glycerol esters and sugar esters are also known to be non-ionic surfactants. A typical non-ionic surfactant class useful with the derivatives of the present invention are the alkylene oxide-treated alkyl phenols such as the ethylene oxide alkyl phenol condensates sold by the Rohm & Haas Company. A specific example of these is Triton X-100 which contains an average of 9–10 ethylene oxide units per molecule, has an HLB value of about 13.5 and a molecular weight of about 628. Many other suitable non-ionic surfactants are known; see, for example, the afore-mentioned McCutcheon's as well as the treatise "Non-ionic Surfactants" edited by Martin J. Schick, M. Drekker Co., New York, 1967, which is hereby incorporated by reference for its disclosures in this regard.

As noted above, cationic, anionic and amphoteric surfactants can also be used in combination with the solubilizers (A) in this invention. Generally, these are all hydrophilic surfactants. Anionic surfactants containing negatively charged polar groups while cationic surfactants contain positively charged polar groups. Amphoteric dispersants contain both types of polar groups in the same molecule. A general survey of useful surfactants is found in Kirk-Othmer Encyclopedia of Chemical Technology, Second Edition, Volume 19, page 507 and following (1969, John Wiley and Son, New York) and the aforementioned compilation published under the name of McCutcheon's. These references are both hereby incorporated by reference for their disclosures relating to cationic, amphoteric and anionic surfactants.

Among the useful anionic surfactant types are the widely known metal carboxylate soaps, organo sulfates, sulfonates, sulfocarboxylic acids and their salts, and phosphates. Useful cationic surfactants include nitrogen compounds such as amine oxides and the well known quaternary ammonium salts. Amphoteric surfactants include amino acid type materials and similar types. Various cationic, anionic and amphoteric dispersants are available from the industry, particularly from such companies as Rohm and Haas and Union Carbide Corporation, both of America. Further information about anionic and cationic surfactants also can be found in the texts "Anionic Surfactants", Parts II and III, edited by W. M. Linfield, published by Marcel Dekker, Inc., New York, 1976 and "Cationic Surfactants", edited by E. Jungermann, Marcel Dekker, Inc., New York, 1976. Both of these references are incorporated by reference for their disclosures in this regard.

The Oil-Soluble, Water-Insoluble Functional Additive (C)

The solubilizer (A)/surfactant (B) combinations of the present invention are useful in dispersing oil-soluble, water-insoluble functional additives (C) in aqueous systems.

The functional additives (C) that can be dispersed with the combinations of this invention are generally well known to those of skill in the art as mineral oil and fuel additives. They generally are not soluble in water beyond the level of one gram per 100 milliliters at 25°, and often are less soluble than that. Their mineral oil solubility is generally about at least one gram per liter at 25°.

Among the functional additives (C) are extreme pressure agents, corrosion and oxidation inhibiting agents, such as chlorinated aliphatic hydrocarbons (e.g., chlorinated waxes), and organic sulfides and polysulfides (e.g., benzyl disulfide, bis(chlorobenzyl)disulfide, dibutyltetrasulfide, sulfurized methyl esters of fatty acid, sulfurized alkyl phenols, sulfurized dipentenes and sulfurized terpenes).

The functional additive (C) can also be chosen from phosphorus-containing materials and include phosphosulfurized hydrocarbons such as the reaction product of a phosphorus sulfide with terpenes or methyl fatty esters, phosphorus esters such as the acid dihydrocarbyl and trihydrocarbyl phosphites such as dibutyl phosphites, diheptyl phosphite, dicyclohexyl phosphite, pentylphenyl phosphite, dipentyl phenyl phosphite, tridecyl phosphite, distearyl phosphite, dimethyl naphthyl phosphite, oleyl 4-pentylphenyl phosphite, polypropylene (molecular weight 500)-substituted phenyl phosphite, diisobutyl-substituted phenyl phosphite; metal thiocarbamates, such as zinc dioctyldithiocarbamate, and barium heptylphenyl dithiocarbamate; Group II metal salts of acid phosphate and thiophosphate hydrocarbyl ester such as zinc dicyclohexyl phosphorodithioate, zinc dioctylphosphorodithioate, barium di(heptylphenol)-phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

Other types of suitable functional additives (C) include carbamates and their thioanalogs, overbased and gelled overbased carboxylic, sulfonic and phosphorus acid salts, high molecular weight carboxylate esters, and nitrogen-containing modifications thereof, high molecular weight phenols, condensates thereof; high molecular weight amines and polyamines; high molecular weight carboxylic acid/amino compound products, etc. Further descriptions of these and other suitable functional additives (C) can be found in the afore-mentioned treatises "Lubricant Additives" which are hereby incorporated by reference for their disclosures in this regard.

Generally, the combination compositions of this invention comprise about 25 to about 75 weight percent solubilizer (A) and about 75 to about 25 weight percent surfactant (B). Typically they comprise from about 40 to about 60 weight percent solubilizer and about 10 to about 60 weight percent surfactant. When present, the oil-soluble, water-insoluble functional additives (C) comprise about 10 to about 50 weight percent. Sometimes these combinations will contain up to about 50% oil; generally up to about 25% oil. This oil, if present, usually serves to reduce the combination's viscosity and thus makes it more convenient to handle. These combinations are generally substantially non-aqueous; that is, they contain less than about 40% water. As such, they can often be non-aqueous concentrates containing (A) solubilizer, (B) surfactant, and optionally (C) functional additive and/or oil. The oil is hydrocarbyl or synthetic (ester, etc.).

The aqueous systems of the present invention contain at least about 40% water and less than about 15% hydrocarbyl oil. The relative amounts of solubilizers (A), surfactants (B) and water-insoluble functional additives (C) (if the latter is present), are within the ranges stated above so that if the water is withdrawn from the system these amounts will be within these ranges. Generally these aqueous systems contain less than about 5% hydrocarbyl oil. Often they are substantially oil-free (i.e., less than 2% oil).

Additive concentrates containing the combination compositions of this invention can be either aqueous or substantially non-aqueous depending upon whether they contain more or less than 40% (by weight) water. Aqueous concentrates for the formulation of water-based functional fluids contain about 40% to about 70% water; generally about 40% to about 65% water. Such concentrates often also contain at least one oil-soluble, water-insoluble functional additive (C). The functional additive's concentration is such that, if the water were removed, it would fall within the range set forth above for the combination composition themselves. Typically these oil-soluble, water-insoluble functional additives (C) are an anti-wear, extreme pressure, and/or load-carrying agent, such as the well-known metal salts of acid phosphates and acid thiophosphate hydrocarbyl esters. An example of the latter are the well-known zinc di(alkyl) or di(aryl) dithiophosphates.

The substantially non-aqueous concentrates are analogous to the afore-described aqueous concentrates except they contain less water (i.e., less than 40%) and proportionately more of the other ingredients.

The substantially non-aqueous and aqueous concentrates of this invention can both be converted to water-based (i.e., aqueous) functional fluids by the dilution with water. This dilution is usually done by standard mixing techniques. This is often a convenient procedure since the concentrate can be shipped to the point of use before the water is added. Thus, the cost of shipping a substantial amount of the water in the final water-based functional fluid is saved. Only the water necessary to formulate the concentrate (which is determined primarily by ease of handling and convenience factors), need be shipped.

Generally these water-based fluids are made by diluting the afore-described substantially non-aqueous and aqueous concentrates with water, wherein the ratio of water to concentrate is in the range of about 80:20 to about 99:1 by weight. As can be seen when dilution is carried out within these ranges, the final water-based functional fluid contains, at most, an insignificant amount of hydrocarbyl oil. This clearly distinguishes them from soluble oils.

Also included within the invention are methods for preparing aqueous systems, including both aqueous concentrates and water-based functional fluids, containing (C) at least one oil-soluble, water-insoluble functional additive. These methods comprise the steps of:

(1) mixing the combination of solubilizer and surfactant with at least one functional additive (C) to form a dispersion/solution; optionally
(2) combining said dispersion/solution with water to form said aqueous concentrates and, with the proviso there is less than about 15% hydrocarbyl oil present, either simultaneously or sequentially, if desired; and/or
(3) diluting said dispersion/solution or concentrate with water wherein the total amount of water used is in the amount required to provide the desired concentration of said functional additive (C) in said concentrate or said water-based functional fluids.

These mixing steps are carried out using conventional equipment and generally at room or slightly elevated temperatures, usually below 100° C. and often below 50° C. The total amounts of (A), (B) and (C) are within the ranges set forth above. As noted above, the non-aqueous or aqueous concentrate can be formed and then shipped to the point of use where it is diluted with water to form the desired water-based functional fluid. In other instances the finished water-based functional fluid can be formed directly in the same equipment used to form the concentrate or dispersion/solution.

The following are specific examples of the present invention. In these examples all parts, percentages and ratios are by weight and all temperatures are in degrees Celsius unless expressly stated to the contrary, as is the case throughout this specification and appended claims.

Example 1(A)

To 6720 parts of a poly(isobutene)-substituted succinic anhydride (having a molecular weight of 1120), heated to 90° with stirring, is slowly added over 1.5 hours 702 parts of diethyl ethanol amine. This intermediate mixture is heated for an additional 0.5 hour at 90° and then 366 parts of monoethanol amine is added. The mixture is held at 90° for a final 0.5 hour and cooled to provide the desired product.

Example 1(B)

A mixture is prepared containing 3600 parts of the afore-described product, 2160 parts of a naphthenic neutral hydrocarbyl oil having a viscosity of 100 SSU at 100° F., 1440 parts of Triton X-100 and 1800 parts of a commercially available load-carrying additive which is the zinc salt of an acid O,O'-di(alkyl-substituted phenyl) dithiophosphate. This mixture is heated to 90° and stirred for 0.5 hour. This concentrate can be diluted with water in the ratio of 80 parts water:20 parts concentrate to provide a water-based hydraulic fluid.

Example 2(A)

To a charge of 224 parts of the succinic anhydride discribed in Example 1(A), heated in a resin kettle with stirring at about 90°, is slowly added over a two-hour period 468 parts of diethyl ethanol amine. Heating is continued for an additional hour at 90°. The desired solubilizer is a viscous, brownish liquid at room temperature.

Example 2(B)

A charge of 4000 parts of the solubilizer, 1000 parts of Triton X-100 and 1667 parts of the commercial antiwear, load-carrying agent described in Example 1(B) is mixed well at 60° to provide a concentrate useful in formulating water-based hydraulic fluids.

Example 3(A)

A mixture is formed by coupling 30 parts of the oil of Example 2(B), 40 parts of the product of Example 1(A) and 30 parts of a commercial surfactant sold under the name Minfoam 2X by the Union Carbide Corporation and identified as a modified linear alcohol ethoxylate is combined to form a mixture.

When 3 parts of this mixture is combined with 7 parts of water and agitated, an aqueous system is formed which shows none of the characteristics of an emulsion. The system is not opaque and there is no obvious phase separation.

Example 3(B)

Nine parts of the mixture of Example 3(A) is combined with 1 part of a commercial high molecular weight, oil-soluble poly(isobutene)-substituted succinic acid/polyol ester dispersant, a well-known functional additive. This combination is then combined with water in the ratio of 3 parts combination to 7 parts water. After agitation the system thus formed, again, does not appear to be an emulsion and is not opaque nor does it show signs of phase separation.

Example 4(A)

A mixture of 4200 parts of the solubilizer described in Example 1(A), 1680 parts of the surfactant described in Example 1(B) and 2520 parts of a zinc di(isooctyl) dithiophosphate is stirred for one hour at 60° and then stored for an additional hour to form a combination.

Example 4(B)

Eight thousand parts of the combination of Example 4(A) is mixed for two hours with 12,000 parts water at a temperature of about 38° to form an aqueous system. This system is then poured through a 30 mesh screen to give an aqueous concentrate having a density of 8.39 pounds per gallon. It can be combined further with water to provide a water-based hydraulic fluid.

Example 5

A combination is prepared in essentially the same fashion as described in Example 4(A) and (B) from 20 parts of the solubilizer described in Example 1(A), 8 parts of the surfactant described in Example 1(B), 8 parts of a commercial anti-wear and load-carrying agent, which is a zinc salt of O,O'-di(isooctyl)dithiophosphoric acid, and 4 parts of a commercial anti-wear agent which is an isobutene-derived polysulfide. This is combined with 60 parts of water to form an aqueous system which is an aqueous concentrate. This system can be diluted in the ratio of 5 parts per weight system to 95 parts by weight water, to make a water-based hydraulic fluid.

Example 6

A mixture of 220 parts of the product of Example 1(A), 120 parts of the zinc dithiophosphate of Example 4(A) and 80 parts of sodium lauryl ether sulfate (sold by Alcolac, Inc., under the trade name Sipon ESY) is prepared. To this stirred mixture at 40°–50° is slowly added 565 parts water and then 15 parts aminopropyl morpholine. The mixture is stirred well to provide the desired concentrate.

Example 7

A mixture is prepared of 220 parts of the product of Example 1(A), 120 parts of the zinc dithiophosphate of Example 4(A) and 80 parts of an ethoxylated oleyl amine (sold under the trade name "Ethomeen O/15" by The Armour Corporation). The mixture is heated to 40°–50° and 20 parts by weight aminopropyl morpholine is slowly added; then 560 parts water is added and the mixture stirred for approximately 0.75 hours to yield a well-mixed concentrate.

Each of the concentrates of Examples 6 and 7 are mixed with water in the weight ratio of 95 parts water to 5 parts concentrate to provide aqueous systems. These systems produce ring-wear rates of 13.1 milligrams/per hour and 7.9 milligrams/per hour when evaluated in a 50 hour vane pump test.

The solubilizer/surfactant combinations of the present invention can also be used to incorporate water into hydrocarbyl fuels such as diesel fuel. This is often desired to reduce the particulate matter in the exhaust of engines using such fuels. It is believed that one mechanism by which this occurs is through the formation of steam in diesel fuel droplets as they are sprayed into the combustion chamber. This steam formation aids in dispersing the diesel fuel so that it is more completely burned to carbon dioxide and water. Generally these fuel/water combinations contain about 0.2% to about 25% solubilizer plus surfactant combination, about 2% to about 20% water with the balance being fuel and other conventional additives. It is believed that such systems are micro- or macro-emulsions. It is found that when such water/fuel emulsions are used in a diesel engine, a reduction of about 7% to about 10% in exhaust particulates results.

I claim:

1. A composition comprising a continuous aqueous phase, and dispersed in said aqueous phase the combination of (A) at least one nitrogen-containing, phosphorus-free carboxylic solubilizer made by the reaction of (A)(I) at least one polycarboxylic acid acylating agent having at least one hydrocarbon-based substituent of at least about 12 to about 500 carbon atoms with (A)(II) at least one (a) N-(hydroxyl-substituted hydrocarbyl) amine, (b) hydroxyl-substituted poly(hydrocarbyloxy) analog of said amine or (c) mixtures of (a) and (b); and (B) at least one surfactant.

2. The composition of claim 1 wherein said acylating agent (A)(I) can be represented by the formula:

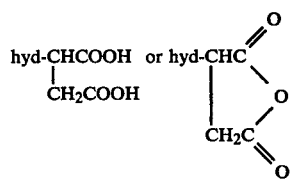

wherein hyd is said hydrocarbon-based substituent.

3. The composition of claim 1 wherein said hydrocarbon-based substituent is an alkyl or an alkenyl group of about 12 to about 500 carbon atoms.

4. The composition of claim 1 wherein said hydrocarbon-based substituent is a poly(isobutene) of about 12 to about 500 carbon atoms.

5. The composition of claim 2 wherein hyd is an alkyl or an alkenyl group of about 12 to about 500 carbon atoms.

6. The composition of claim 2 wherein hyd is poly(isobutene) of about 12 to about 500 carbon atoms.

7. The composition of claim 1 wherein the amine (A)(II) has from 1 to 4 hydroxyl groups per molecule bonded to a hydrocarbyl group, said hydrocarbyl group being bonded to the amine portion of the molecule.

8. The composition of claim 1 wherein the amine (A)(II) contains up to about 40 carbon atoms.

9. The composition of claim 1 wherein the amine (A)(II) is a primary, secondary or tertiary alkanol amine of up to about 40 carbon atoms.

10. The composition of claim 1 wherein the amine (A)(II) is a mixture of at least two alkanol amines of up to about 40 carbon atoms.

11. The composition of claim 1 wherein the amine (A)(II) is a hydroxy-substituted primary amine of the formula $$R_a\text{—}NH_2$$

wherein $R_a$ is a monovalent organic radical containing at least one hydroxy group, the total number of carbon atoms in $R_a$ not exceeding about 20.

12. The composition of claim 11 wherein the total number of carbon atoms in $R_a$ does not exceed 10.

13. The composition of claim 11 wherein $R_a$ contains up to 4 hydroxyl groups.

14. The composition of claim 11 $R_a$ is a monohydroxy-substituted alkyl group.

15. The composition of claim 1 wherein the amine (A)(II) is selected from the group consisting of (a) primary, secondary and tertiary alkanol amines which can be represented correspondingly by the formulae:

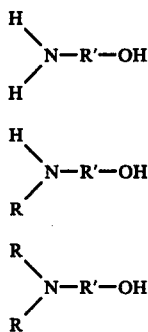

(b) hydroxyl-substituted oxyalkylene analogs of said alkanol amines represented by the formulae:

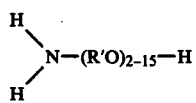

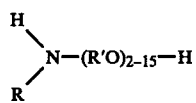

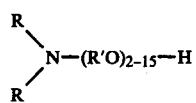

wherein each R is independently a hydrocarbyl group of one to about 8 carbon atoms or hydroxyl-substituted hydrocarbyl group of 2 to about 8 carbon atoms and R' is a divalent hydrocarbyl group of two to about 18 carbon atoms, and (c) mixtures of two or more thereof.

16. The composition of claim 1 wherein the amine (A)(II) is a mixture of diethylethanolamine and ethanolamine.

17. The composition of claim 1 wherein the surfactant (B) is a non-ionic, cationic, or anionic hydrophilic surfactant.

18. The composition of claim 1 wherein the surfactant (B) is an anionic surfactant.

19. The composition of claim 1 wherein the surfactant (B) is a hydrophilic surfactant having an HLB value of about 10 to about 20.

20. The composition of claim 1 wherein the surfactant (B) is an ethoxylated alkyl phenol.

21. The composition of claim 1 wherein the surfactant (B) is selected from the group consisting of carboxylate soaps, organo sulfates, sulfonates, sulfocarboxylic acids and/or their salts, and phosphates.

22. The composition of claim 1 wherein there is also present in the solubilizer forming reaction mixture at least one lower molecular weight carboxylic acylating agent of 1 to about 18 carbon atoms in addition to the acylating agent (A)(I).

23. The composition of claim 22 wherein said lower molecular weight acylating agent is a fatty acid of 10 to 18 carbon atoms.

24. The composition of claim 22 wherein said lower molecular weight acylating agent is a low molecular weight alkyl or alkenyl succinic acid.

25. The composition of claim 22 wherein said lower molecular weight acylating agent is tetrapropenyl succinic anhydride.

26. The composition of claim 1 wherein there is also present in the solubilizer forming reaction mixture at least one lower molecular weight substituted succinic acid or anhydride in addition to the acylating agent (A)(I), said lower molecular weight succinic acid or anhydride being represented by the formulae:

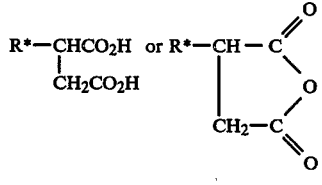

wherein R* is a hydrocarbyl group of about 1 to about 10 carbon atoms.

27. The composition of claim 2 wherein there is also present in the solubilizer forming reaction mixture at least one lower molecular weight substituted succinic acid or anhydride in addition to the acylating agent (A)(I), said lower molecular weight succinic acid or anhydride being represented by the formulae:

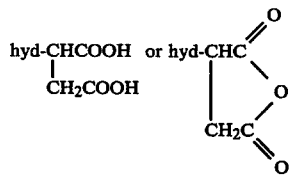

wherein R* is a hydrocarbyl group of about 1 to about 10 carbon atoms.

28. The composition of claim 1 wherein there is also present in solubilizer forming reaction mixture in addition to the acylating agent (A)(I) at least one acid halide of a lower molecular weight carboxylic acid acylating agent of about 1 to about 18 carbon atoms.

29. A composition comprising a continuous aqueous phase, and dispersed in said aqueous phase the combination of (A) at least one nitrogen-containing, phosphorus-free carboxylic solubilizer made by the reaction of (A)(I) at least one polycarboxylic acid acylating agent having at least one hydrocarbon-based substituent of at least about 20 to about 500 carbon atoms with (A)(II) at least one (a) N-(hydroxyl-substituted hydrocarbyl) amine, (b) hydroxyl-substituted poly(hydrocarbyloxy) analog of said amine or (c) mixtures of (a) and (b); and (B) at least one surfactant.

30. The composition of claim 29 wherein said acylating agent (A)(I) can be represented by the formula:

$$\text{hyd-CHCOOH} \quad \text{or} \quad \begin{array}{c} \text{hyd-CHC} \\ | \\ \text{CH}_2\text{COOH} \end{array} \begin{array}{c} \diagup \text{O} \\ \diagdown \text{O} \\ \diagup \\ \text{CH}_2\text{C} \diagdown \text{O} \end{array}$$

wherein hyd is said hydrocarbon-based substituent.

31. The composition of claim 29 wherein said hydrocarbon-based substituent is an alkyl or an alkenyl group of about 20 to about 500 carbon atoms.

32. The composition of claim 29 wherein said hydrocarbon-based substituent is a poly(isobutene) of about 20 to about 500 carbon atoms.

33. The composition of claim 30 wherein hyd is an alkyl or an alkenyl group of about 20 to about 500 carbon atoms.

34. The composition of claim 30 wherein hyd is poly(isobutene) of about 20 to about 500 carbon atoms.

35. The composition of claim 29 wherein the amine (A)(II) has from 1 to 4 hydroxyl groups per molecule bonded to a hydrocarbyl group, said hydrocarbyl group being bonded to the amine portion of the molecule.

36. The composition of claim 29 wherein the amine (A)(II) contains up to about 40 carbon atoms.

37. The composition of claim 29 wherein the amine (A)(II) is a primary, secondary or tertiary alkanol amine of up to about 40 carbon atoms.

38. The composition of claim 29 wherein the amine (A)(II) is a mixture of at least two alkanol amines of up to about 40 carbon atoms each.

39. The composition of claim 29 wherein the amine (A)(II) is a hydroxy-substituted primary amine of the formula $$R_a\text{—NH}_2$$

wherein $R_a$ is monovalent organic radical containing at least one hydroxy group, the total number of carbon atoms in $R_a$ not exceeding about 20.

40. The composition of claim 39 wherein the total number of carbon atoms in $R_a$ does not exceed 10.

41. The composition of claim 39 wherein $R_a$ contains up to four hydroxyl groups.

42. The composition of claim 39 $R_a$ is a monohydroxy-substituted alkyl group.

43. The composition of claim 29 wherein the amine (A)(II) is selected from the group consisting of (a) primary, secondary and tertiary alkanol amines which can be represented correspondingly by the formula:

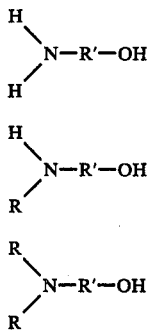

(b) hydroxyl-substituted oxyalkylene analogs of said alkanol amines represented by the formulae:

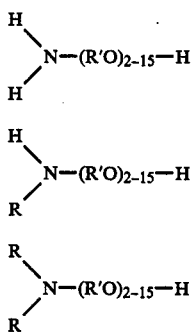

wherein each R is independently a hydrocarbyl group of one to about 8 carbon atoms or hydroxyl-substituted hydrocarbyl group of 2 to about 8 carbon atoms and R' is a divalent hydrocarbyl group of two to about 18 carbon atoms, and (c) mixtures of two or more thereof.

44. The composition of claim 29 wherein the amine (A)(II) is a mixture of diethylethanolamine and ethanolamine.

45. The composition of claim 29 wherein the surfactant (B) is a nonionic, cationic, or anionic hydrophilic surfactant.

46. The composition of claim 29 wherein the surfactant (B) is an anionic surfactant.

47. The composition of claim 29 wherein the surfactant (B) is a hydrophilic surfactant having an HLB value of about 10 to about 20.

48. The composition of claim 29 wherein the surfactant (B) is an ethoxylated alkyl phenol.

49. The composition of claim 29 wherein the surfactant (B) is selected from the group consisting of carboxylate soaps, organo sulfates, sulfonates, sulfocarboxylic acids and/or their salts, and phosphates.

50. The composition of claim 29 wherein there is also present in the solubilizer forming reaction mixture at least one lower molecular weight carboxylic acylating agent of 1 to about 18 carbon atoms in addition to the acylating agent (A)(I).

51. The composition of claim 50 wherein said lower molecular weight acylating agent is a fatty acid of 10 to 18 carbon atoms.

52. The composition of claim 50 wherein said lower molecular weight acylating agent is a low molecular weight alkyl or alkenyl succinic acid.

53. The composition of claim 50 wherein said lower molecular weight acylating agent is tetrapropenyl succinic anhydride.

54. The composition of claim 29 wherein there is also present in the solubilizer forming reaction mixture at least one lower molecular weight substituted succinic acid or anhydride in addition to the acylating agent (A)(I), said lower molecular weight succinic acid or anhydride being represented by the formulae:

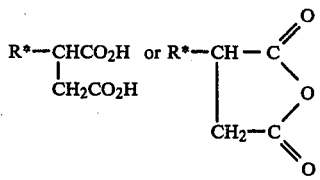

wherein R* is a hydrocarbyl group of about 1 to about 10 carbon atoms.

55. The composition of claim 30 wherein there is also present in the solubilizer forming reaction mixture at least one lower molecular weight substituted succinic acid or anhydride in addition to the acylating agent (A)(I), said lower molecular weight succinic acid or anhydride being represented by the formulae:

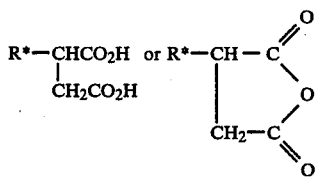

wherein R* is a hydrocarbyl group of about 1 to about 10 carbon atoms.

56. The composition of claim 29 wherein there is also present in solubilizer forming reaction mixture in addition to the acylating agent (A)(I) at least one acid halide of a lower molecular weight carboxylic acid acylating agent of about 1 to about 18 carbon atoms.

57. A composition comprising a continuous aqueous phase, and dispersed in said aqueous phase the combination of (A) at least one nitrogen-containing, phosphorus-free carboxylic solubilizer made by the reaction of (A)(I) at least one polycarboxylic acid acylating agent having at least one hydrocarbon-based substituent of at least about 20 to about 500 carbon atoms with (A)(II) at least one (a) N-(hydroxyl-substituted hydrocarbyl) amine; and (B) at least one surfactant.

58. The composition of claim 57 wherein said acylating agent (A)(I) can be represented by the formula:

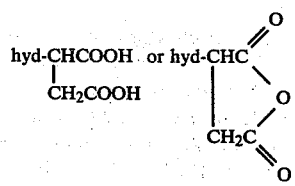

wherein hyd is said hydrocarbon-based substituent.

59. The composition of claim 57 wherein said hydrocarbon-based substituent is an alkyl or an alkenyl group of about 20 to about 500 carbon atoms.

60. The composition of claim 57 wherein said hydrocarbon-based substituent is a poly(isobutene) of about 20 to about 500 carbon atoms.

61. The composition of claim 58 wherein hyd is an alkyl or an alkenyl group of about 20 to about 500 carbon atoms.

62. The composition of claim 57 wherein the amine (A) (II) has from 1 to 4 hydroxyl groups per molecule bonded to a hydrocarbyl group, said hydrocarbyl group being bonded to the amine portion of the molecule.

63. The composition of claim 57 wherein the amine (A) (II) contains up to about 40 carbon atoms.

64. The composition of claim 57 wherein the amine (A) (II) is a primary, secondary or tertiary alkanol amine of up to about 40 carbon atoms.

65. The composition of claim 57 wherein the amine (A) (II) is a mixture of at least two alkanol amines of up to about 40 carbon atoms each.

66. The composition of claim 57 wherein the amine (A) (II) is selected from the group consisting of primary, secondary and tertiary alcohol amines which can be represented correspondingly by the formulae:

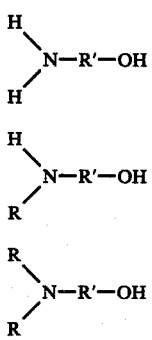

wherein each R is independently a hydrocarbyl group of 1 to about 8 carbon atoms or hydroxyl-substituted hydrocarbyl group of 2 to about 8 carbon atoms and R' is a divalent hydrocarbyl group of 2 to about 18 carbon atoms, or mixtures thereof.

67. The composition of claim 57 wherein the amine (A) (II) is a mixture of diethylethanolamine and ethanolamine.

68. The composition of claim 57 wherein the surfactant (B) is a nonionic, cationic, or anionic hydrophilic surfactant.

69. The composition of claim 57 wherein the surfactant (B) is an anionic surfactant.

70. The composition of claim 57 wherein the surfactant (B) is a hydrophilic surfactant having an HLB value of about 10 to about 20.

71. The composition of claim 57 wherein the surfactant (B) is an ethoxylated alkyl phenol.

72. The composition of claim 57 wherein there is also present in the solubilizer forming reaction mixture at least one lower molecular weight carboxylic acylating agent of 1 to about 18 carbon atoms in addition to the acylating agent (A) (I).

73. The composition of claim 72 wherein said lower molecular weight acylating agent is a fatty acid of 10 to 18 carbon atoms.

74. The composition of claim 72 wherein said lower molecular weight acylating agent is tetrapropenyl succinic anhydride.

75. The composition of any of claims 1, 29 or 57 wherein said combination comprises about 25% to about 75% by weight of solubilizer (A) and about 75% to about 25% by weight of surfactant (B).

76. A composition as claimed in any of claims 1, 2, 3, 4, 5, 6, 7, 8–25, 26–28, 29, 30, 31, 32, 33, 34, 35, 36–53 54–56, 57, 58, 59, 60, 61, 62, 63–74 which also comprises (C) at least one oil-soluble, water-insoluble functional additive.

77. An aqueous system comprising the composition of any of claims 1, 2, 3, 4, 5, 6, 7, 8–25, 26–28, 29, 30, 31, 32, 33, 34, 35, 36–53, 54–56, 57, 58, 59, 60, 61, 62, 63–74, said composition comprising at least about 40% water and less than about 15% hydrocarbyl oil.

78. An aqueous system comprising the composition of any of claims 1, 2, 3, 4, 5, 6, 7, 8–25, 26–28, 29, 30, 31, 32, 33, 34, 35, 36–53, 54–56, 57, 58, 59, 60, 61, 62, 63–74, and (C) at least one oil-soluble, water-insoluble functional additive.

79. An aqueous system comprising the composition of any of claims 1, 2, 3, 4, 5, 6, 7, 8–25, 26–28, 29, 30, 31, 32, 33, 34, 35, 36–53, 54–56, 57, 58, 59, 60, 61, 62, 63–74, said system further comprising about 40% to about 70% water and less than about 15% hydrocarbyl oil and being an aqueous concentrate.

80. An aqueous system comprising the composition of any of claims 1, 2, 3, 4, 5, 6, 7, 8–25, 26–28, 29, 30, 31, 32, 33, 34, 35, 36–53, 54–56, 57, 58, 59, 60, 61, 62, 63–74, and (C) at least one oil-soluble, water-insoluble functional additive, said system further comprising about 40% to about 70% water and less than about 15% hydrocarbyl oil and being an aqueous concentrate.

81. The composition of claim 76 wherein the additive (C) is an anti-wear, extreme-pressure agent and/or load-carrying agent.

82. The composition of claim 76 wherein the additive (C) is a metal salt of an acid phosphate or acid thiophosphate hydrocarbyl ester.

83. A water-based functional fluid made by diluting the system of claim 79 with water wherein the ratio of water to concentrate is in the range of about 80:20 to about 99:1.

84. A water-based functional fluid made by diluting the system of claim 80 with water wherein the ratio of water to concentrate is in the range of about 80:20 to about 99:1.

85. A method for preparing an aqueous system containing (C) at least one oil-soluble, water-soluble functional additive which comprises the steps of:
(1) mixing the composition of any one of claims 1, 2, 3, 4, 5, 6, 7, 8–25, 26–28, 29, 30, 31, 32, 33, 34, 35, 36–53, 54–56, 57, 58 59, 60, 61, 62, or 63–74 with said functional additive (C) to form a dispersion/solution;
(2) combining said dispersion/solution with water to form a concentrate: and (3) diluting said concentrate with water wherein the total amount of water used is in the amount required to provide the desired concentration of said functional additive (C) in said aqueous system.

86. The composition of claim 76 wherein the functional additive (C) is at least one phosphorus- and/or sulfur-containing additive.

87. A method of preparing an aqueous concentrate containing (C) at least one oil-soluble, water-insoluble functional additive which comprises the steps of:
(1) mixing the composition of any one of claims 1, 2, 3, 4, 5, 6, 7, 8-25, 26-28, 29, 30, 31, 32, 33, 34, 35, 36-53, 54-56, 57, 58, 59, 60, 61, 62, or 63-74 with said functional additive (C) to form a dispersion/solution; and
(2) combining said dispersion/solution with water to form said concentrate.

88. A method of preparing an aqueous system containing (C) at least one oil-soluble, water-insoluble functional additive which comprises the steps of:
(1) mixing the composition of any one of claims 1, 2, 3, 4, 5, 6, 7, 8-25, 26-28, 29, 30, 31, 32, 33, 34, 35, 36-53, 54-56, 57, 58, 59, 60, 61, 62, or 63-74 with said functional additive (C) to form a dispersion/solution; and
(2) diluting said dispersion/solution with water wherein the total amount of water used is in the amount required to provide the desired concentation of said functional additive (C) in said aqueous system.

* * * * *